(12) United States Patent
Bruckman et al.

(10) Patent No.: US 7,280,560 B2
(45) Date of Patent: Oct. 9, 2007

(54) DIFFERENTIATED SERVICES WITH MULTIPLE TAGGING LEVELS

(75) Inventors: Leon Bruckman, Petah-Tikva (IL); Omer Goldfisher, Givataim (IL); Gal Mor, Hezeli (IL); David Zelig, Givataim (IL)

(73) Assignee: Corrigent Systems Ltd., Tel Aviv (IL)

( * ) Notice: Subject to any disclaimer, the term of this patent is extended or adjusted under 35 U.S.C. 154(b) by 945 days.

(21) Appl. No.: 10/128,454

(22) Filed: Apr. 24, 2002

(65) Prior Publication Data

US 2003/0202467 A1    Oct. 30, 2003

(51) Int. Cl.
*H04L 12/50* (2006.01)

(52) U.S. Cl. ............... 370/468; 370/230; 370/230.1; 370/231; 370/235; 370/235.1

(58) Field of Classification Search ........... 370/229, 370/230, 352, 389, 392, 400, 401, 464, 465, 370/468, 235, 235.1, 230.1
See application file for complete search history.

(56) References Cited

U.S. PATENT DOCUMENTS

| | | | |
|---|---|---|---|
| 5,235,593 A | | 8/1993 | Grow et al. |
| 5,282,203 A | * | 1/1994 | Oouchi ................. 370/232 |
| 6,515,965 B1 | * | 2/2003 | Hou et al. ............. 370/233 |
| 6,646,988 B1 | * | 11/2003 | Nandy et al. .......... 370/235 |
| 6,785,232 B1 | * | 8/2004 | Kotser et al. .......... 370/230.1 |
| 6,826,147 B1 | * | 11/2004 | Nandy et al. .......... 370/229 |
| 6,947,382 B1 | * | 9/2005 | Bianchini et al. ...... 370/232 |
| 7,042,846 B2 | | 5/2006 | Bauer |
| 7,123,583 B2 | * | 10/2006 | Hoar et al. ........... 370/230 |
| 7,161,899 B2 | | 1/2007 | Limaye |
| 7,161,904 B2 | * | 1/2007 | Hussain et al. ....... 370/230 |
| 2002/0186661 A1 | * | 12/2002 | Santiago et al. ...... 370/252 |
| 2003/0055920 A1 | * | 3/2003 | Kakadia et al. ....... 709/220 |

OTHER PUBLICATIONS

Blake, S. et al., "Architecure for Differentiated Services," *Internet Engineering Task Force*, Network Working Group, RFC 2475 [online], Dec. 1998 [retrieved on Sep. 27, 2002]. Retrieved from the Internet:<URL: http://ietf.org/rfc/rfc2475.txt!number=2475, 34 pages.

(Continued)

*Primary Examiner*—Wing Chan
*Assistant Examiner*—Mark A. Mais
(74) *Attorney, Agent, or Firm*—Sterne, Kessler, Goldstein & Fox, P.L.L.C.

(57) ABSTRACT

A method for handling traffic in a communication network includes setting an aggregate limit on a total rate of transmission of information by a group of flows to be transmitted over the network, and setting a respective individual limit on an individual rate of transmission by each of the flows in the group. When the information carried by packets in any given one of the flows is in excess of the respective individual limit, the packets in excess of the respective individual limit in the given one of the flows are tagged with a first excess flow tag. When the total rate of transmission of the information is in excess of the aggregate limit, the packets in excess of the aggregate limit are tagged with a second excess flow tag. Resources in the network are allocated to convey the packets responsive to the first and second excess flow tags.

14 Claims, 2 Drawing Sheets

OTHER PUBLICATIONS

Seddigh, N. et al., "An Assured Rate Per-Domain Behaviour for Differentiated Services <draft-ietf-diffserv-pdb-ar-01.txt>," *Internet Engineering Task Force, Differentiated Services Working Group,* Internet Draft [online], Jul. 2001 [retrieved on Sep. 27, 2002]. Retrieved from the Internet:<URL: http://www.ietf.org/proceedings/02mar/I-D/draft-ietf-diffserv-pdb-ar-01.txt, 9 pages.

Herrera, A. et al., "A Framework for IP over Resilient Packet Rings," *Internet Engineering Task Force,* Network Working Group, Internet Draft [online], Jun. 2001. Retrieved from the Internet:<URL: http://www.ietf.org/proceedings/02mar/I-D/draft-ietf-iporpr-framework-01.txt, 16 pages.

Tsiang, D. et al., "The Cisco SRP MAC Layer Protocol," *Internet Engineering Task Force, Network Working Group,* RFC 2892 [online], Aug. 2000. Retrieved from the Internet:<URL: ftp://ftp.isi.edu/in-notes/rfc2892.txt, pages 1-47.

* cited by examiner

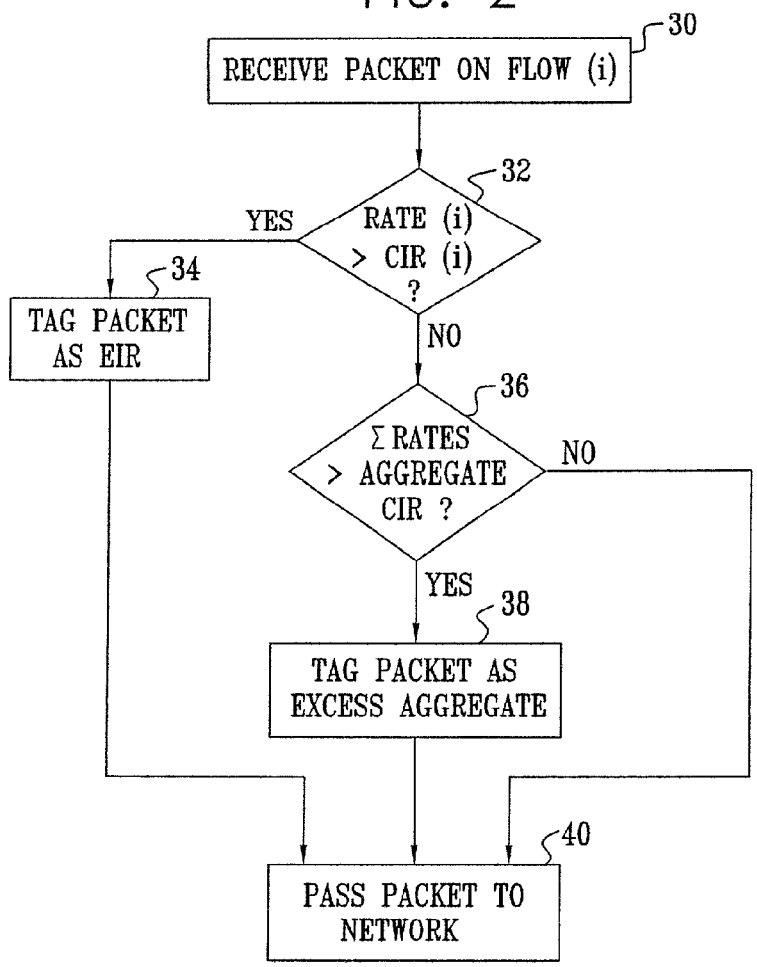
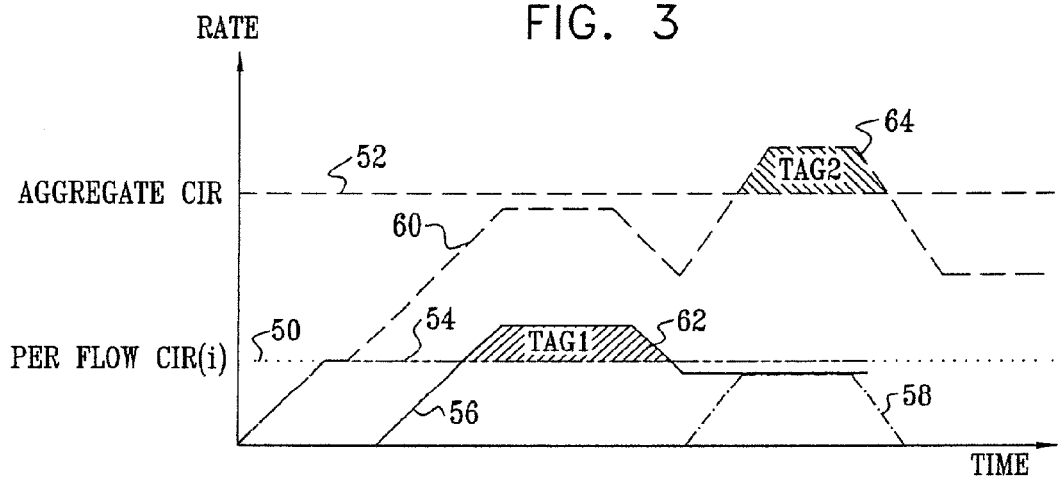

DIFFERENTIATED SERVICES WITH MULTIPLE TAGGING LEVELS

FIELD OF THE INVENTION

The present invention relates generally to network communications, and specifically to provision of differentiated services on digital communication networks.

BACKGROUND OF THE INVENTION

Modern packet communication networks are commonly configured to carry multiple different types of communication traffic and applications, with different service requirements. These requirements may be expressed in quantitative or statistical terms, based on characteristics such as throughput, delay, jitter, packet loss, or other measures of priority. Network users typically enter into agreements with network service providers that specify the level of service the users are to receive, expressed in terms of these sorts of differentiating service characteristics. The service provider must program the nodes in the network so that they can determine how to treat each packet they receive and forward, depending on the applicable service characteristics.

Various service differentiation schemes are known in the art. Most of these schemes are based on tagging packets (also known as "marking" or "labeling" packets) to indicate their class of service, priority and/or other traffic handling characteristics. An exemplary service differentiation scheme is described by Blake et al., in "An Architecture for Differentiated Services," published by the Internet Engineering Task Force (IETF) Network Working Group as Request for Comments (RFC) 2475 (1998), which is incorporated herein by reference. This and other IETF documents cited herein are available at www.ietf.org. The nodes in a given network service domain decide whether to forward, delay or drop each packet they receive depending on the tags carried by the packets and the availability of network resources to process and forward the packets. The terms "tag" and "tagging" as used in the present patent application and in the claims should be understood as referring to any addition or modification of a predetermined field in data packets transmitted through a network for purposes of service differentiation and traffic handling.

One characteristic according to which services are commonly differentiated is their allocation of bandwidth, which may be guaranteed or opportunistic. At any point in time, resources that are not being used by guaranteed service components may be used by opportunistic components. Services with mixed guaranteed and opportunistic bandwidth components may also be available. The most popular services can be grouped in the following categories:

Guaranteed, fixed bandwidth (GF): This service does not have any opportunistic component, and the network must ensure timely delivery of all packets that comply with the service bandwidth.

Guaranteed with excess (GE): This service includes a guaranteed component, usually known in the art as its Committed Information Rate (CIR), and an excess component, known as Excess Information Rate (EIR). The network must deliver all packets that comply with the CIR and make its best efforts to deliver the excess traffic.

Best Efforts (BE): This is a service that has only an opportunistic component. The network will make its best efforts to deliver the packets, but no guarantees are made.

In communication networks that are based on statistical multiplexing techniques, such as Internet Protocol (IP) and Frame Relay networks, optimal utilization of network resources can be achieved by shifting them dynamically between users. Thus, the opportunistic services noted above take advantage of free resources available during periods of low guaranteed service traffic. Another common practice is to overbook network resources, by provisioning more services than the network can actually handle. Overbooking is commonly used for opportunistic service components. During times when the network is not congested (low utilization), the opportunistic services can use their full provisioned bandwidth. When the network is congested, the opportunistic services use whatever bandwidth is left over from guaranteed services. The overbooking ratio is defined as the ratio of the total provisioned bandwidth for BE and excess traffic to the total available bandwidth for these services.

When overbooking is used, and the available bandwidth for opportunistic traffic is less than the total provisioned, the available bandwidth is preferably fairly distributed among the services. The fair distribution may be an equal distribution among the services, or a weighted distribution. For example, excess traffic from guaranteed services may receive a higher weight than pure BE traffic. One such scheme for allocating excess bandwidth is defined by Seddigh et al., in an IETF Internet Draft entitled "An Assured Rate Per-Domain Behavior for Differentiated Services" (draft-ietf-diffserv-pdb-ar-01.txt, July, 2001), which is incorporated herein by reference.

Overbooking may also be applied to guaranteed services, creating a situation in which the sum of the CIRs allocated to all the guaranteed services exceeds an Aggregate CIR Limit (ACL). In other words:

$$\Sigma CIR(\text{guaranteed services}) = ACL \times Overbooking.$$

Although overbooking guaranteed services may appear to contradict the nature of such services, the statistical behavior of the network connections allows service providers to work in this way and thus to make more cost-effective use of available network resources. The actual resources of the network are typically assigned in accordance with the ACL only.

SUMMARY OF THE INVENTION

In determining how to differentiate between guaranteed and excess traffic in the presence of guaranteed service overbooking, the question arises whether to tag packets by user flow or by aggregate flow. For proper handling of overbooked traffic, it is necessary to determine when the aggregate flow exceeds the ACL, according to which the network resources are allocated, and to tag the packets that are above the ACL. On the other hand, when a particular user flow exceeds its CIR, the packets above the CIR should be tagged as excess, regardless of the level of aggregate flow. Methods of service differentiation and traffic handling known in the art do not provide a solution that can deal with both excessive aggregate flow and individual user flows.

Therefore, in preferred embodiments of the present invention, a dual tagging scheme is applied to packets transmitted through a network on guaranteed services. As the packets pass into the network via an ingress node, the node checks the rate of information in each user flow against the individual CIR limit applicable to that flow. Any packets exceeding the individual limit are tagged as excess per-flow packets and are treated accordingly by the network. Typically, such packets may be discarded in conditions of network congestion. The ingress node also checks the total rate of information flow on all the guaranteed service flows against the aggregate limit (ACL). Guaranteed packets in excess of the aggregate limit are tagged as excess guaranteed packets and are handled accordingly.

Thus, service differentiation with overbooking can be handled properly at both the individual flow and the aggregate level.

There is therefore provided, in accordance with a preferred embodiment of the present invention, a method for handling traffic in a communication network, including:

receiving a group of flows of data packets for transmission over the network;

setting an aggregate limit on a total rate of transmission of information by the group of flows;

setting individual limits on the flows including a respective individual limit on an individual rate of transmission of the information by each of the flows in the group;

when the information carried by the packets in any given one of the flows is in excess of the respective individual limit, tagging the packets in excess of the respective individual limit in the given one of the flows with a first excess flow tag;

when the total rate of transmission of the information is in excess of the aggregate limit, tagging the packets in excess of the aggregate limit with a second excess flow tag; and allocating resources in the network to convey the packets responsive to the first and second excess flow tags.

Typically, receiving the group of flows includes receiving the packets for transmission using one or more guaranteed services, and setting the aggregate and individual limits includes imposing the limits on the one or more guaranteed services. Preferably, allocating the resources includes transmitting the packets that are tagged only with the second excess flow tag with a higher priority than the packets that are tagged with the first excess flow tag. In a preferred embodiment, the one or more guaranteed services include a guaranteed service with excess, and allocating the resources includes transmitting the packets that are tagged with the first excess flow tag on a best-effort basis. Most preferably, allocating the resources includes transmitting the packets that are not tagged with either the first or second excess flow tag with a higher priority than the tagged packets.

Preferably, tagging the packets with the second excess flow tag includes tagging the packets in excess of the aggregate limit that are not tagged with the first excess flow tag. Further preferably, setting the individual limits includes overbooking the resources in the network, so that a sum of the individual limits over all the flows exceeds the aggregate limit. Most preferably, allocating the resources includes, in conditions of network congestion, forwarding the packets that are not tagged in preference to those that are tagged.

There is also provided, in accordance with a preferred embodiment of the present invention, apparatus for network communication, including a plurality of nodes mutually coupled to form a network, the nodes including an ingress node, which is adapted to receive a group of flows of data packets for transmission over the network, and to process the flows responsive to an aggregate limit on a total rate of transmission of information by the group of flows and to individual limits on the flows that include a respective individual limit on an individual rate of transmission of the information by each of the flows in the group, such that when the information carried by the packets in any given one of the flows is in excess of the respective individual limit, the network ingress node tags the packets in excess of the respective individual limit in the given one of the flows with a first excess flow tag, and when the total rate of transmission of the information is in excess of the aggregate limit, the network ingress node tags the packets in excess of the aggregate limit with a second excess flow tag, causing the nodes to allocate resources to convey the packets through the network responsive to the first and second excess flow tags.

The present invention will be more fully understood from the following detailed description of the preferred embodiments thereof, taken together with the drawings in which:

BRIEF DESCRIPTION OF THE DRAWINGS

FIG. 2 is a flow chart that schematically illustrates a method for tagging packets for transmission through a network, in accordance with a preferred embodiment of the present invention; and FIG. 3 is a schematic plot of information rate against time, illustrating an application of the method of FIG. 2.

DETAILED DESCRIPTION OF PREFERRED EMBODIMENTS

Figure 1:
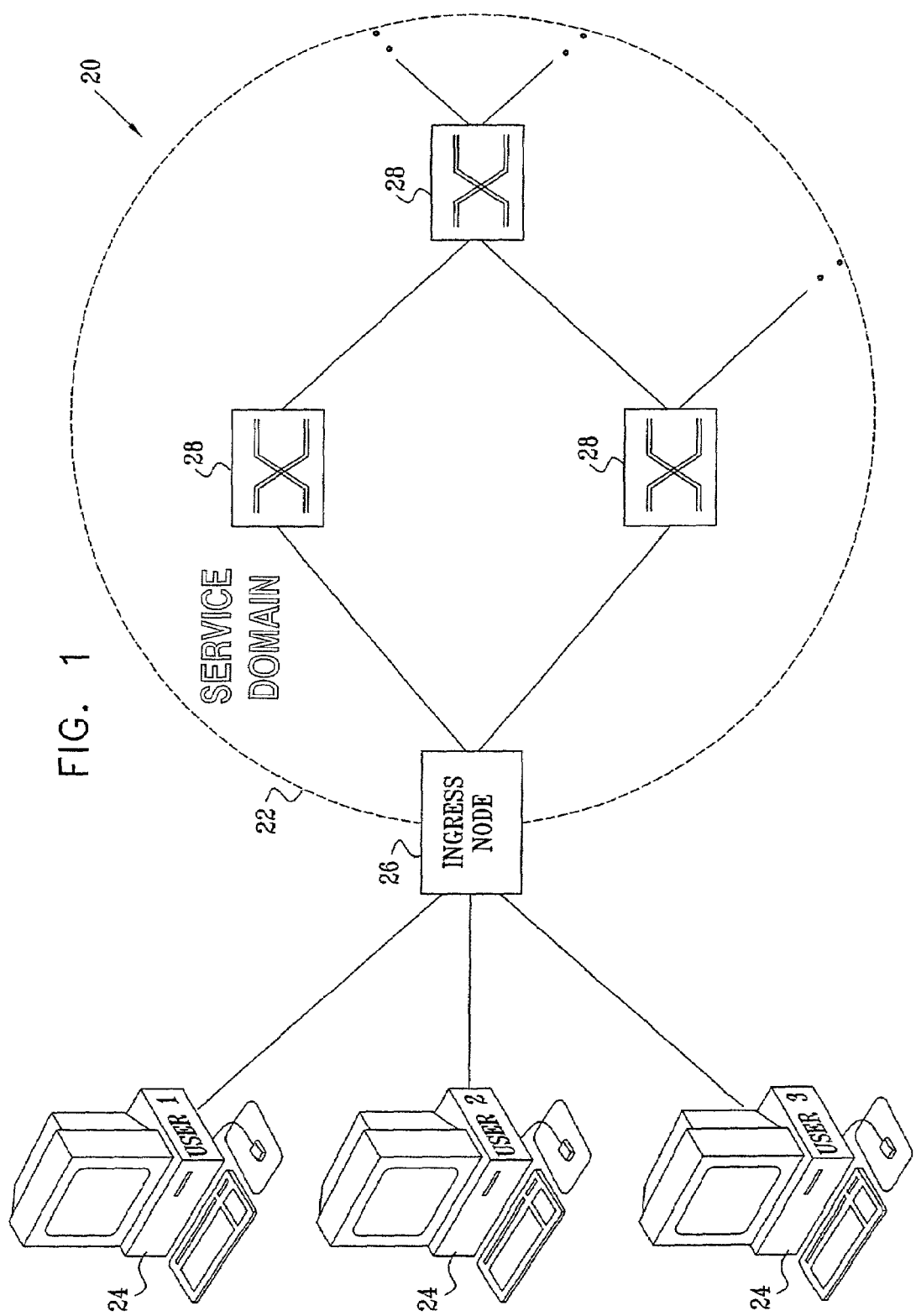
FIG. 1 is a block diagram that schematically illustrates a network communication system with service differentiation, in accordance with a preferred embodiment of the present invention.

FIG. 1 is a block diagram that schematically illustrates a network communication system 20, in accordance with a preferred embodiment of the present invention. A group of users 24 of network services transmit data packets into a differentiated communication service domain 22 via an ingress node 26. As defined in the above-mentioned RFC 2475, domain 22 comprises a set of nodes 28, which have a common service provisioning policy and implement predefined packet forwarding behavior based on the policy. Typically, domain 22 is made up of one or more packet communication networks under the same administration.

Each of users 24 has a service level agreement (SLA) that provides a certain amount of guaranteed bandwidth, typically with the possibility of opportunistic excess bandwidth above the guaranteed minimum (i.e., GE-type service, as described in the Background of the Invention). Assume, for example, that the total available bandwidth, or information rate, via ingress node 26 is 1 Gbps, and the total aggregate bandwidth (ACL) allowed for guaranteed services via node 26 is 250 Mbps, with overbooking of up to 400%. Assume further that there are ten users 24 (although for simplicity, only three are shown in the figure), each with CIR=100 Mbps of guaranteed bandwidth and up to EIR=500 Mbps of excess bandwidth. Since the overbooking of the guaranteed bandwidth is 400%, all of the guaranteed services (10×100 Mbps) will be accepted and provisioned within the total available bandwidth of 1 Gbps (4×250 Mbps). Although in this example, for the sake of simplicity, all the users have the same service conditions and limits, the methods described herein can similarly be applied to cases in which different flows have different limits imposed on them.

FIG. 2 is a flow chart that schematically illustrates a method implemented by ingress node 26 in tagging packets transmitted into service domain 22 by users 24, in accordance with a preferred embodiment of the present invention. Node 26 polices and tags each user flow according to its individual CIR, regardless of the overbooking factor. In addition, node 26 polices and tags the aggregate flow from all the users according to the collective ACL.

The process of FIG. 2 begins each time node 26 receives a packet from one of users 24 for transmission into service domain 22, at a packet input step 30. Here the users are referred to by an arbitrary index, i. Ingress node 26 first checks the data flow for the individual user that sent the packet to determine whether it is in excess of the CIR for this user, at an individual rate checking step 32. In other words, in terms of the present example, the ingress node calculates whether the user has transmitted guaranteed traffic into domain 22 at a rate exceeding 100 Mbps over some predetermined measurement period, taking the current packet into account. If so, node 26 adds a tag of a first type to the packet, marking it as belonging to the user's EIR, at a first tagging step 34.

As long as the packet is within the user's CIR, ingress node 26 next checks to determine whether the aggregate flow of guaranteed data for all of users 24 is in excess of the ACL, at an aggregate rate checking step 36. Thus, in the present example, the ingress node calculates whether users 24 have together transmitted guaranteed traffic into domain 22 at an aggregate rate exceeding 250 Mbps over the present measurement period, including the current packet. If so, node 26 adds a tag of a second type to the packet, at a second tagging step 38. This second tag indicates that the packet is in excess of the ACL, but still must be treated as guaranteed service.

After ingress node 26 has processed and, as appropriate, tagged the packet, it passes the packet into service domain 22, at a packet output step 40. Nodes 28 forward the packet to its destination, applying differential treatment depending on the tag that has been added to the packet. In the event of network congestion or a strain on network resources for some other reason, nodes 28 will typically give preference to guaranteed traffic (untagged) that is within the ACL, followed by guaranteed traffic that is tagged (at step 38) as having exceeded the ACL. Excess traffic (tagged at step 34) is typically next in order of priority for network resources, followed by best-efforts services. Alternatively or additionally, further priority gradations and variations in this order may also be used. When the traffic exceeds the carrying capacity of network resources, packets are preferably delayed or discarded in reverse order of this priority.

FIG. 3 is a plot of information rate against time, illustrating application of the method of FIG. 2 to the example given above. Each user 24 has an individual CIR of 100 Mbps, shown by a dotted line 50 in FIG. 3, and all the users together have an ACL of 250 Mbps, shown in the figure by a dashed line 52. The individual user information transmission rates for the three users shown in FIG. 1 are represented in FIG. 3 by individual traces 54, 56 and 58. The aggregate transmission rate of all the users together is represented by an aggregate trace 60.

As shown by trace 56, during a first period 62, the individual information transmission rate of one of the users (say USER 2), exceeds 100 Mbps. During this period, packets sent by USER 2 in excess of 100 Mbps are tagged with the first tag, as excess traffic.

During a second period 64, the aggregate information rate exceeds 250 Mbps, although none of users 24 is exceeding the individual CIR of 100 Mbps. Therefore, packets sent by the users in excess of 250 Mbps are tagged with the second tag type, as guaranteed traffic above the ACL. Tagging of the packets in this situation is preferably applied across all the user flows, according to a fair allocation scheme. For example, the percentage by which the aggregate flow exceeds the ACL may be computed, and then this percentage of the traffic in each user flow may be tagged. Alternatively, the percentage of tagging may be determined per-flow, so that the total fraction of packets tagged over all the flows is equal to the percentage by which the aggregate flow exceeds the ACL. Further alternatively, the appropriate percentage of the packets may be tagged as they pass through the ingress node, without regard to the flow to which the packets belong.

Although preferred embodiments are described herein using the vocabulary of the differentiated service architecture described in RFC 2475, the principles of the present invention are similarly applicable, mutatis mutandis, to differentiated network service environments of other types, so long as these environments support (or can be modified to support) multiple tagging levels. The terms "tag" and "tagging" are used here generically to refer to identification of excess traffic, as described hereinabove, and all suitable methods of tagging (regardless of the term used to refer to the "tag") are considered to be within the scope of the present invention. Furthermore, although the preferred embodiments described above deal mainly with differentiating between guaranteed and opportunistic services, the principles of the present invention may more generally be applied in differentiating between any services having different levels of priority or other distinguishing service characteristics.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for handling traffic in a communication network, comprising:

receiving a group of flows of data packets for transmission over the network;

setting an aggregate limit on a total rate of transmission of information by the group of flows;

setting individual limits on the flows including a respective individual limit on an individual rate of transmission of the information by each of the flows in the group;

when the information carried by the packets in any given one of the flows is in excess of the respective individual limit, tagging the packets in excess of the respective individual limit in the given one of the flows with a first excess flow tag;

when the total rate of transmission of the information is in excess of the aggregate limit, tagging with a second excess flow tag the packets in excess of the aggregate limit that are not tagged with the first excess flow tag; and allocating resources in the network to convey the packets responsive to the first and second excess flow tags, wherein receiving the group of flows comprises receiving the packets for transmission using one or more guaranteed services, and wherein setting the aggregate and individual limits comprises imposing the limits on the one or more guaranteed services, and wherein allocating the resources comprises transmitting the packets that are not tagged with either the first or second excess flow tag with a higher priority than the tagged packets.

2. A method for handling traffic in a communication network, comprising:

receiving a group of flows of data packets for transmission over the network;

setting an aggregate limit on a total rate of transmission of information by the group of flows;

setting individual limits on the flows including a respective individual limit on an individual rate of transmission of the information by each of the flows in the group;

when the information carried by the packets in any given one of the flows is in excess of the respective individual limit, tagging the packets in excess of the respective individual limit in the given one of the flows with a first excess flow tag;

when the total rate of transmission of the information is in excess of the aggregate limit, tagging with a second excess flow tag the packets in excess of the aggregate limit that are not tagged with the first excess flow tag; and allocating resources in the network to convey the packets responsive to the first and second excess flow tags, wherein receiving the group of flows comprises receiving the packets for transmission using one or more guaranteed services, and wherein setting the aggregate and individual limits comprises imposing the limits on the one or more guaranteed service, and wherein allocating the resources comprises transmitting the packets that are tagged only with the second excess flow tag with a higher priority than the packets that are tagged with the first excess flow tag.

3. A method according to claim 2, wherein the one or more guaranteed services comprise a guaranteed service with excess, and wherein allocating the resources comprises transmitting the packets that are tagged with the first excess flow tag on a best-effort basis.

4. A method according to claim 1, wherein setting the individual limits comprises overbooking the resources in the network, so that a sum of the individual limits over all the flows exceeds the aggregate limit.

5. A method according to claim 1, wherein allocating the resources comprises, in conditions of network congestion, forwarding the packets that are not tagged in preference to those that are tagged.

6. Apparatus for network communication, comprising:

a plurality of nodes mutually coupled to form a network and arranged to allocate resources to convey the packets though the network responsive to first and second excess flow tags, the nodes including:

an ingress node, which is adapted to receive a group of flows of data packets for transmission over the network, and to process the flows responsive to an aggregate limit on a total rate of transmission of information by the group of flows and to individual limits on the flows that include a respective individual limit on an individual rate of transmission of the information by each of the flows in the group, wherein the ingress node is operative, when the information carried by the packets in any given one of the flows is in excess of the respective individual limit, to tag the packets in excess of the respective individual limit in the given one of the flows with the first excess flow tag, and when the total rate of transmission of the information is in excess of the aggregate limit, to tag with the second excess flow tag the packets in excess of the aggregate limit that are not tagged with the first excess flow tag, and wherein the data packets are received for transmission using one or more guaranteed services, to which the aggregate and individual limits apply, and wherein the nodes are adapted to forward the packets that are not tagged with either the first or second excess flow tag with a higher priority than the tagged packets.

7. Apparatus for network communication, comprising:

a plurality of nodes mutually coupled to form a network and arranged to allocate resources to convey the packets though the network responsive to first and second excess flow tags, the nodes including:

an ingress node, which is adapted to receive a group of flows of data packets for transmission over the network, and to process the flows responsive to an aggregate limit on a total rate of transmission of information by the group of flows and to individual limits on the flows that include a respective individual limit on an individual rate of transmission of the information by each of the flows in the group, wherein the ingress node is operative, when the information carried by the packets in any given one of the flows is in excess of the respective individual limit, to tag the packets in excess of the respective individual limit in the given one of the flows with the first excess flow tag, and when the total rate of transmission of the information is in excess of the aggregate limit, to tag with the second excess flow tag the packets in excess of the aggregate limit that are not tagged with the first excess flow tag, and wherein the data packets are received for transmission using one or more guaranteed services, to which the aggregate and individual limits apply, and wherein the nodes are adapted to forward the packets that are tagged only with the second excess flow tag with a higher priority than the packets that are tagged with the first excess flow tag.

8. Apparatus according to claim 7, wherein the one or more guaranteed services comprise a guaranteed service with excess, and wherein the nodes are adapted to forward the packets that are tagged with the first excess flow tag on a best-effort basis.

9. Apparatus according to claim 6, wherein the resources in the network are overbooked, so that a sum of the individual limits over all the flows exceeds the aggregate limit.

10. Apparatus according to claim 6, wherein the nodes are adapted, in conditions of network congestion, to forward the packets that are not tagged in preference to those that are tagged.

11. A method according to claim 2, wherein setting the individual limits comprises overbooking the resources in the network, so that a sum of the individual limits over all the flows exceeds the aggregate limit.

12. A method according to claim 2, wherein allocating the resources comprises, in conditions of network congestion, forwarding the packets that are not tagged in preference to those that are tagged.

13. Apparatus according to claim 7, wherein the resources in the network are overbooked, so that a sum of the individual limits over all the flows exceeds the aggregate limit.

14. Apparatus according to claim 7, wherein the nodes are adapted, in conditions of network congestion, to forward the packets that are not tagged in preference to those that are tagged.

* * * * *